United States Patent [19]
Ashe et al.

[11] 3,746,872

[45] July 17, 1973

[54] TOMOGRAPHY TECHNIQUE IN WHICH A SINGLE RECORDING FILM RETAINS SPATIAL INFORMATION TO PERMIT CONSTRUCTING ALL PLANAR SECTIONS OF OBJECT

[75] Inventors: John B. Ashe; James D. Hall, both of Austin, Tex.

[73] Assignee: Nuclear-Chicago Corporation, Des Plaines, Ill.

[22] Filed: July 27, 1971

[21] Appl. No.: 166,510

[52] U.S. Cl.........................................250/313
[51] Int. Cl.. G01n 21/00, G01n 23/00, G01n 23/04
[58] Field of Search....................... 250/60, 61, 61.5, 250/65

[56] References Cited

UNITED STATES PATENTS 2,207,867 7/1940 Loebell .............................. 250/61.5

*Primary Examiner*—James W. Lawrence
*Assistant Examiner*—T. N. Grigsby
*Attorney*—Lowell C. Bergstedt et al.

[57] ABSTRACT

An x-ray holotomographic system in which a holotomographic shadow image is recorded on a stationary recording medium such as film as an object is exposed to rays from varying angles and the holotomographic shadow image is decoded using a decoding light source and decoding lens system to produce a reconstructed three dimensional image space representative of the original three dimensional object.

10 Claims, 4 Drawing Figures

INVENTORS
JOHN B. ASHE
JAMES D. HALL
BY Lowell C. Bergstedt
ATTORNEY

INVENTORS
JOHN B. ASHE
JAMES D. HALL
BY Lowell C. Bergstedt
ATTORNEY

TOMOGRAPHY TECHNIQUE IN WHICH A SINGLE RECORDING FILM RETAINS SPATIAL INFORMATION TO PERMIT CONSTRUCTING ALL PLANAR SECTIONS OF OBJECT

All of the early work in x-ray tomography was directed toward producing an in-focus image of a single preselected plane through an object by blurring out shadow images produced by structure on all planes except the preselected plane. This was accomplished by a combined motion of either the source and the recording medium or the object and the recording medium which rendered the shadow image from one plane only as a stationary image on the recording medium. To image a different plane required a resetting of the equipment parameters or repositioning of the object before repeating the procedure. The production of multiple plane tomographic images by this approach is extremely time consuming, involves an undesirable increase in the radiation dose to a human patient imaged, and requires the use of a number of sheets of fairly expensive film. These disadvantages have limited the clinical application of x-ray tomography by this approach. Repetitive imaging procedures have been avoided in some systems by using stacked films and a complicated pivoting mechanism, but these systems have not been well received because of their complexity and limited capability.

More recently, x-ray tomographic approaches which enable reconstruction of multiple selectable planes after performing a single imaging procedure have been developed. These approaches involve taking a multiplicity of short individual exposures from varying angles and combining the resulting multiple discrete images in various ways to product a final image depicting a single selectable in-focus plane. (See U. S. Pat. No. 3,499,146, issued on Mar. 3, 1970, to A. G. Richards and an article in the "APL Technical Digest", Vol. 9, No. 3, Jan.-Feb. 1970, pp. 10–16, by Grant, Garrison, and Johns.)

It is the principle object of this invention to provide an x-ray holotomographic system in which a single holotomographic shadow image is recorded on a stationary recording means as an object is exposed to penetrating radiation along an extended path and the holotomographic image is decoded to produce an in-focus image of a selectably oriented plane through the object.

The term "holotomography" is used herein to denote that the single shadow image recorded in accordance with this invention does not per se comprise a discrete recognizable image of the object, but rather contains specific information on each point in the object in the form of a unique image path or, in other words, a "characteristic response function". The image paths for various points are superimposed on the holotomographic shadow image, but decoding of the recorded image in accordance with the known characteristic response function recovers the information on points in the object across a selectable plane.

A complete description of the x-ray holotomographic system in accordance with this invention is given below in conjunction with the accompanying drawings in which.

Figure 1:
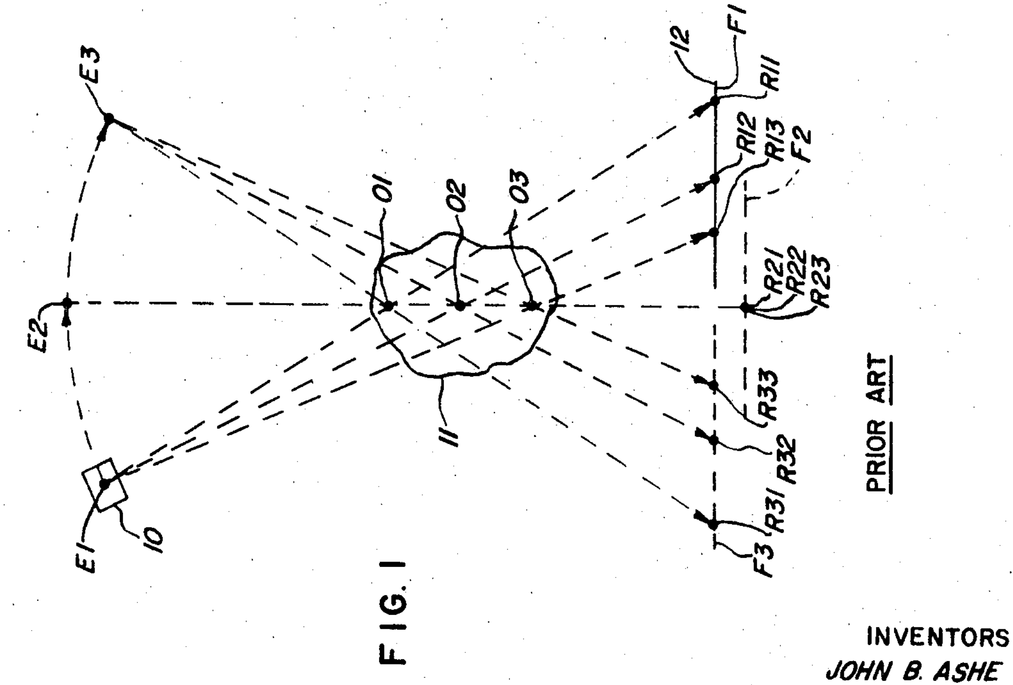
FIG. 1 illustrates a one-dimensional x-ray tomographic system in accordance with the prior art.

By reference to FIG. 1, several of the prior art approaches to one-dimensional x-ray tomography can be explained. The simplest and earliest approach was to move the exposing source 10 on one side of an object 11 and a recording medium such as film 12 on the other side of the object in a synchronous manner such that the image from one plane remained stationary on the recording medium. Thus, in FIG. 1, if x-ray source 10 is moved continuously along the path E1-E2-E3 while film 12 moves continuously from position F1 to position F3, point 02 produces a stationary image on the film. However, point 01 produces an image which moves from a far right point R11 to a far left point R31 on film 12, and the point 03 produces an image which moves from a left point R13 to a right point R33 on film 12. Clearly the image of point 02 and all points on a horizontal plane through point 02 will remain stationary on the film whereas the images of points on all other planes will be smeared out. This produces a single tomographic image of the horizontal plane through point 02. To produce a second tomographic image of a horizontal plane through point 01 or point 03 would require that object 11 be repositioned or the source-film movement be altered appropriately.

The multiplane x-ray tomography approach in U. S. Pat. No. 3,499,146 would involve exposing multiple individual films in positions F1, F2, and F3 and orienting the films in various ways to produce tomographic images of various planes. It can easily be seen from FIG. 1 that superimposing the images of films F1, F2, and F3 could be accomplished so that either points R11, R21 and R31, or R12, R22 and R32, or R13, R23 and R33 are directly on top of each other and thereby the image of point 01, point 02 or point 03 is, respectively, in focus. Clearly for these various superpositioning of images additional object points on horizontal planes through points 01, 02, and 03 would also be in focus.

The multiplane x-ray tomography approach in the above-referenced APL article would also involve exposing multiple individual films, such as F1, F2, and F3, and superimposing the images on the various films by illuminating each film with light from an actual or virtual point source corresponding to the position of the x-ray source during original exposure of that film and thereby creating a reconstructed three dimensional image space in which placement of a screen or film at a selectable orientation enables viewing an in-focus image of a particular plane through the original object.

Figure 2:
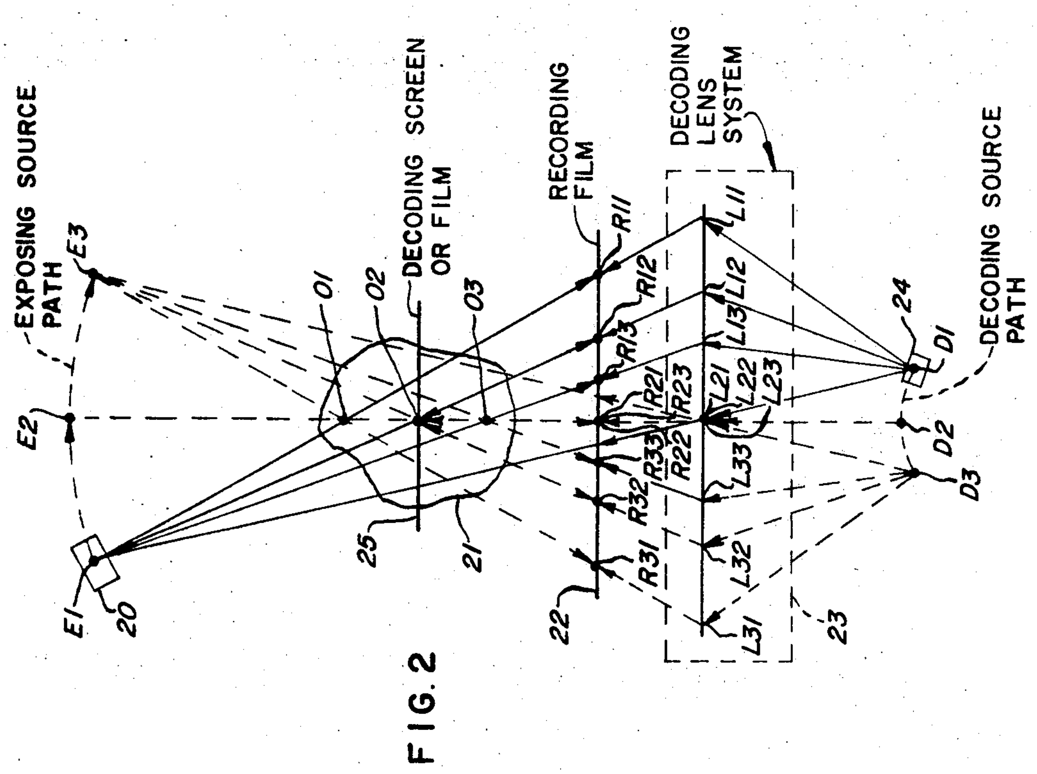
FIG. 2 illustrates a one-dimensional x-ray holotomographic system in accordance with this invention.

By reference to FIG. 2 a novel approach to one-dimensional x-ray tomography called holotomography, in accordance with this invention can be explained. As shown in FIG. 2 an exposing source 20 is moved along a path E1-E2-E3. Object 21 and film 22 are stationary as source 20 moves. Decoding lens system 23, decoding source 24, and decoding screen or film 25 are not present during the exposure. It is apparent from FIG. 2 that, as source 20 moves along its path from E1 to E3, the shadow images from points 01, 02, and 03 each move in a particular way. For example, the image of point 01 moves from location R11 to location R31 while point 03 moves from R13 to R33. Thus point 01 maps into a line on film 22 between locations R11 and R31. Point 02 maps into a shorter line between R12 and R32, and point 03 maps into a still shorter line between R13 and R33. It should be apparent that each point on a horizontal plane through point 01 would also map onto film 22 as a line of the same length as the R11 to R31 distance but in a different location. Similarly points on horizontal planes through points 02 and 03 would map onto film 22 as lines equal in length to the lines generated by points 02 and 03. In general, it can be seen that the length of the line image generated by a point in the object varies directly with the distance of the point from the recording film plane.

The resultant image on recording film 22 is not in-focus for any plane through object 21 and a simple visual inspection of film 22 would not typically yield any useful information about object 21. However, the resultant image on recording film 22 can be decoded in accordance with the known characteristic response function for points in the object, and thus the shadow image on recording film Q2 may be called a "holotomographic shadow image". As shown in FIG. 2 decoding of a holotomographic shadow image can be achieved by a decoding light source 24 which follows a path geometrically similar to that of the exposing source and a decoding lens system 23 which directs rays from decoding light source 24 through film 22 in a reverse direction along ray paths from exposing source 20. The directed light rays may be detected on a decoding screen or film 25. This reverse illumination of the holotomographic shadow-image refocuses the information in the form of line segments on the shadow image back to points in an image space corresponding to points in object 21 from which the information originally came. Thus in FIG. 2 the information for point 02 is obtained from the holotomographic shadow image on film 22 by the convergence on screen 25 of light rays following paths D1-L12-R12-02, D2-L22-R2-02, D3-L32-R32-02 as well as many other rays passing through film 22 along a line between R12 and R32 and converging on point 02.

It can easily be seen from FIG. 2 that, with decoding screen 25 placed horizontally through point 02, all of the information on film 22 originating from a corresponding plane through object 21 will be converged at proper locations on screen 25 to produce an in-focus image of that object plane. It should also be apparent that any other plane through object 21 can be imaged in-focus by relocating screen 25. Moreover, imaging is not limited to horizontal planes, and planes at any angle can be imaged by angling screen 25. Screen 25 could also be curved to provide an image of a curved surface through object 21.

Again with reference to FIG. 2, it should be apparent that decoding source 24, instead of travelling along the path shown, could be an extended light source having uniform light emission and shaped to the geometry of the decoding source path. With such an extended light source, the light rays passing out of decoding lens system 23 through recording film 22 would produce a constant three dimensional image space representative of object 21. Any plane in that space could be imaged in-focus by placement of a screen or film in a selected location.

The exposing source path and the decoding source path could be straight rather than curved line segments without altering the operation of the system.

Another mode of the invention would involve placing a plurality of discrete x-ray exposing sources along an exposing source path and using a corresponding number of decoding light sources placed in an identical geometry. Still another mode of the invention would involve employing a continuous extended x-ray exposing source together with a continuous extended decoding light source. The continuous x-ray source could be implemented by using a radioisotopic x-ray emitter distributed over the desired geometry. The series of discrete x-ray sources could also be implemented with discrete radioisotopic x-ray sources.

It should be apparent that the holotomographic x-ray system shown in FIG. 2 could be converted to a two dimensional system in a number of ways. The exposing source or the object could be rotated through 90° after an initial exposure in one dimension, and the exposure process could be repeated in the second dimension. The decoding source and decoding lens system would have to be rotated 90° after the first decoding process to decode in the second dimension. Alternatively the decoding source and decoding lens system could be altered to produce a continuous X shaped decoding light source and a decoding lens system which would image the light source into the geometry of the exposing source paths. Also the exposing source could be either a continuous X shaped source or a series of discrete sources having the same geometry, with of course the decoding light source having the same character and geometry.

Figure 3:
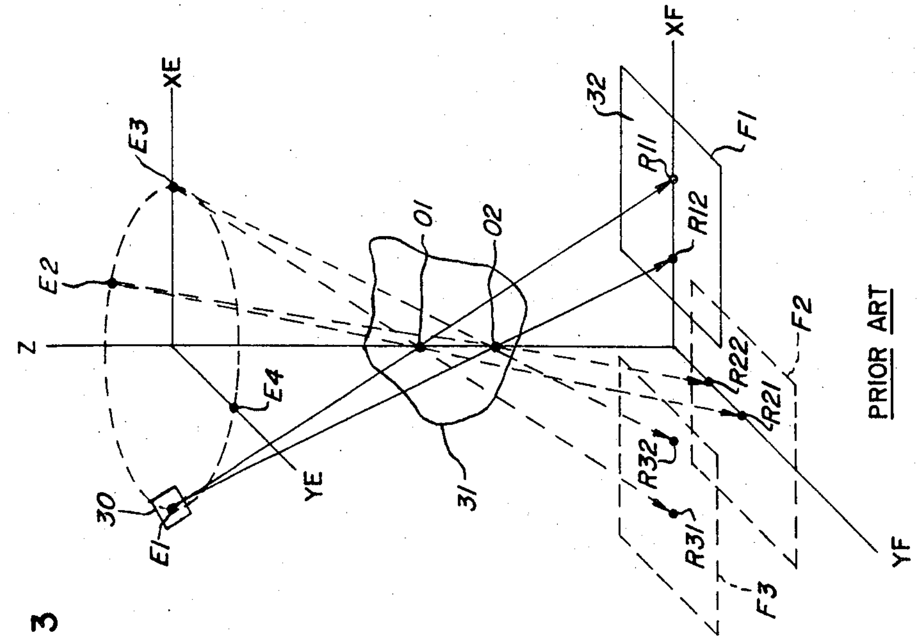
FIG. 3 illustrates a two-dimensional x-ray tomographic system in accordance with the prior art.

FIG. 3 illustrates prior art approaches to two-dimensional x-ray tomography using a circular source movement and corresponding circular film plane movement. The principles of operation of the system of FIG. 3 are essentially the same as that of FIG. 1. To produce a single plane tomographic image on a single film, exposing source 30 and film 32 are rotated synchronously in circular paths such that shadow images of one plane in object 31 remain stationary on film 32. In FIG. 3 the plane of point 01 is the tomographic plane imaged. By taking multiple discrete images on separate films at various points along the circular paths of the exposing source and the film and recombining the information as taught in U. S. Pat. No. 3,499,146 or in the APL article, multiplane tomographic images can be produced.

Figure 4:
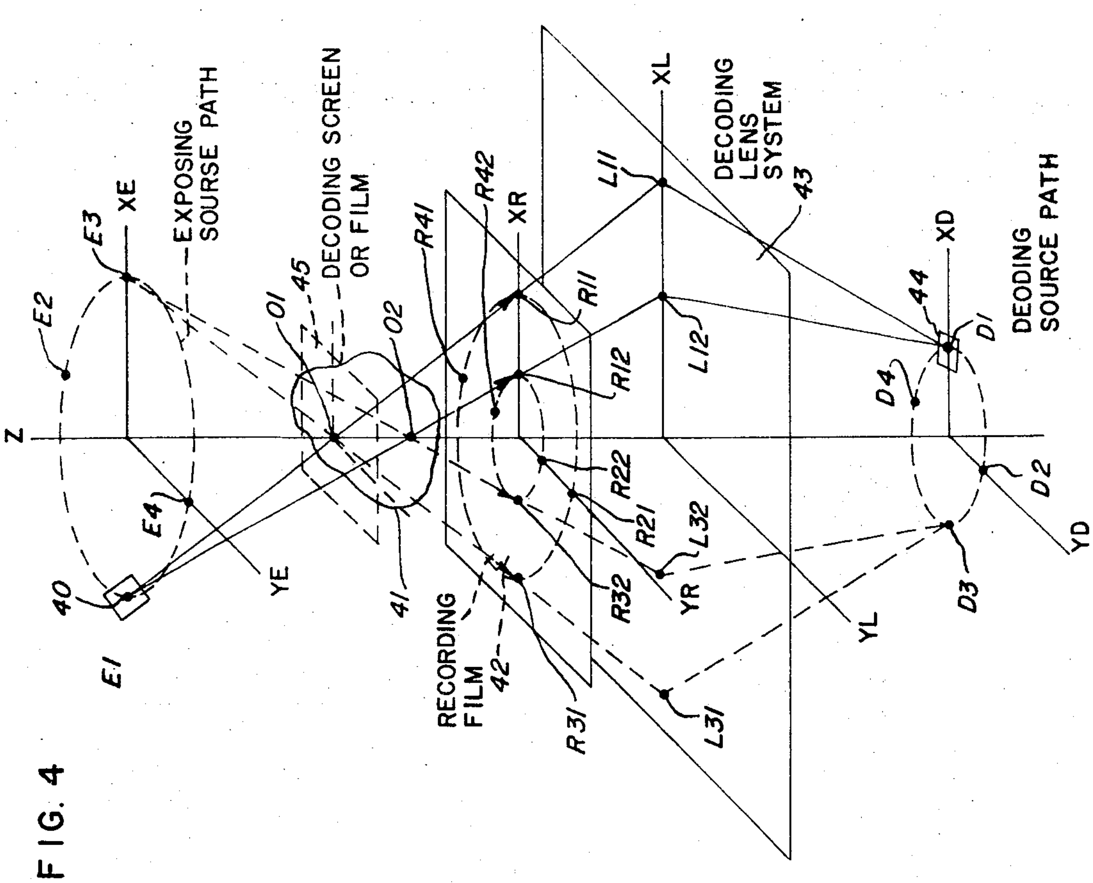
FIG. 4 illustrates a two-dimensional x-ray holotomographic system in accordance with this invention.

FIG. 4 illustrates a two dimensional holotomographic x-ray system in accordance with this invention. In this system the path of exposing source 40 is circular and each point in object 41 maps onto stationary recording film 42 as a circle having a radius varying directly as the distance of a point from film 42. A circular path for decoding source 44 and a decoding lens system 43 which directs light from decoding source 44 through film 42 in a reverse direction along ray paths from exposing source 40 enables decoding of an in-focus image of any object plane on a decoding screen or film 45.

Similar to the FIG. 2 system, decoding source 44 may be an extended light source having a circular geometry to produce a continuous three dimensional image space representative of object 41 on the other side of the holotomographic shadow image on film 42. Also a plurality of discrete x-ray sources spaced along the circular exposing path together with a corresponding number of similarly placed discrete encoding light sources may be employed. Further an extended x-ray source such as a radioisotopic x-ray emitter in a circular geometry could be employed.

The above description of various embodiments of this invention are exemplary and not intended to limit the scope of this invention. Other approaches to recording and decoding a holotomographic shadow image other than optical recording and decoding are clearly within the scope of this invention, and numerous other modifications of systems disclosed herein could be accomplished by those skilled in the art without departing from the scope of this invention as claimed in the following claims.

We claim:

1. Apparatus for producing tomographic images of a three dimensional object comprising exposing means for exposing an object on one side to a source of penetrating radiation along an extended path having a preselected geometry;

image recording means adapted to be supported in a stationary position on an opposite side of said object for recording a single holotomgraphic shadow image having a characteristic response function for each point in said object depending on said preselected geometry; and decoding means for decoding said shadow image on the basis of said characteristic response function to produce an in-focus image of a selectably oriented surface through said object.

2. Apparatus as claimed in claim 1, wherein said exposing means comprises a substantially point source of x-rays moving at a uniform rate along said extended path;

said image recording means comprises a sheet of recording film; and said decoding means comprises a decoding light source and a decoding lens system constructed and arranged to illuminate said recording film with light rays directed in a reverse sense along ray paths substantially corresponding to ray paths from said x-ray source through said object to said recording film so as to produce on a side of said recording film opposite said light source and lens system a three dimensional image space representative of said three dimensional object.

3. Apparatus as claimed in claim 2, wherein said decoding light source comprises a substantially point source of light moving at a uniform rate along a path having a geometry corresponding to said preselected geometry, and said decoding means further comprises a decoding film adapted to be supported in a selectable orientation in said three dimensional image space to record said in-focus image of a surface through said object.

4. Apparatus as claimed in claim 2, wherein said decoding light source comprises an extended source of light having a geometry corresponding to said preselected geometry so as to produce said three dimensional image space on a continuous basis; and said decoding means further comprises one of a decoding screen or a decoding film adapted to be supported in a selectable orientation in said three dimensional image space.

5. Apparatus as claimed in claim 1, wherein said exposing means comprises an extended source of x-rays having said preselected geometry;

said image recording means comprises a sheet of recording film; and said decoding means comprises an extended decoding light source having a geometry corresponding to said preselected geometry and a decoding lens system between said decoding light source and said recording film constructed to direct light rays from said decoding light source through said recording film in a reverse sense along ray paths substantially corresponding to ray paths from said extended source of x-rays through said object to said recording film, thereby to produce on an opposite side of said recording film a three dimensional image space representative of said three dimensional object.

6. Apparatus as claimed in claim 5, wherein said decoding means further comprises a planar decoding element adapted to be supported in a selectable orientation in said three dimensional image space to manifest an in-focus image of said object across a surface corresponding to said orientation.

7. Apparatus as claimed in claim 6, wherein said planar decoding element comprises one of a decoding screen or a decoding film.

8. Apparatus as claimed in claim 5, wherein said extended source of x-rays comprises a plurality of individual point sources of x-rays arranged in a regularly spaced manner; and said extended decoding light source comprises a plurality of individual point sources of light corresponding in number to said point sources of x-rays and arranged in a corresponding regularly spaced manner.

9. Apparatus as claimed in claim 8, wherein said individual point sources of x-rays each comprises a radioisotopic x-ray source.

10. Apparatus as claimed in claim 5, wherein said extends source of x-rays comprises a body of radioactive material emitting x-rays and shaped in said preselected geometry.

* * * * *